(12) United States Patent
Williams

(10) Patent No.: US 6,244,362 B1
(45) Date of Patent: Jun. 12, 2001

(54) WEIR BOX FOR DRILLING MUD SEPARATION UNIT

(76) Inventor: J. Terrell Williams, P.O. Box 1821, Lake Charles, LA (US) 70602

( * ) Notice: Subject to any disclaimer, the term of this patent is extended or adjusted under 35 U.S.C. 154(b) by 0 days.

(21) Appl. No.: 09/146,940

(22) Filed: Sep. 3, 1998

Related U.S. Application Data

(60) Provisional application No. 60/061,427, filed on Oct. 8, 1997.

(51) Int. Cl.[7] .................................................... F21B 21/06
(52) U.S. Cl. ......................... 175/206; 210/297; 210/418
(58) Field of Search ................................. 175/206, 207; 166/267; 210/110, 297, 400, 418

(56) References Cited

U.S. PATENT DOCUMENTS

| | | | |
|---|---|---|---|
| 2,446,293 | * 8/1948 | Minyard | 210/403 |
| 2,716,493 | * 8/1955 | Hutchison | 209/269 |
| 2,750,043 | * 6/1956 | Thompson | 210/340 |
| 3,988,243 | * 10/1976 | Huff | 210/297 |
| 4,911,834 | * 3/1990 | Murphy | 175/206 |
| 4,940,535 | * 7/1990 | Fisher et al. | 175/206 |
| 5,853,583 | * 12/1998 | Shah | 175/206 |
| 5,863,430 | * 1/1999 | Williams | 175/206 |
| 5,921,399 | * 7/1999 | Bakula et al. | 210/400 |

\* cited by examiner

*Primary Examiner*—Eileen D. Lillis
*Assistant Examiner*—Frederick L. Lagman
(74) *Attorney, Agent, or Firm*—Finnegan, Henderson, Farabow, Garrett & Dunner, L.L.P.

(57) ABSTRACT

A weir box disposed upstream from conventional solids control equipment of a mud system of a drilling rig contains a drilling mud separation unit having a continuous-loop scalper screen that is driven in a continuous loop to separate, convey and discharge large amounts of gumbo, heavy clays and drill solids at the end of the separation unit. The flow divider box is a box-like housing with a diverter plate, weir baffle plates and a sliding gate that allows drilling fluid or drilling mud to be selectively directed to the mud separation unit to be separated prior to passing to the conventional downstream solids control equipment or allows the fluid to bypass the separation unit and flow directly to the conventional solids control equipment. The sliding gate is adjustable to selectively control or meter the flow rate and to create a hydrostatic head upstream from the conventional solids control equipment. The weir box baffle plates, sliding gate, and selective utilization of the mud separation unit allows the operator to produce an increased hydrostatic head, which enables high flow rates to be easily processed by shale shakers and other conventional downstream solids control equipment of the mud system and to compliment the drilling operation with respect to changes in the lithology, geological formations, or loss of returns in relation to the gallons pumped or volume of drilling fluid or drilling mud entering the weir box.

6 Claims, 5 Drawing Sheets

WEIR BOX FOR DRILLING MUD SEPARATION UNIT

This application claims benefit of Provisional Application No. 60/061,427 filed Oct. 8, 1997.

BACKGROUND OF THE INVENTION

1. Field of the Invention

The invention relates to drilling mud control equipment, and more particularly to a weir box with a diverter plate, weir baffle plates and a sliding gate that allows drilling fluid or drilling mud to be selectively directed to a drilling mud separation unit contained therein or to bypass the separation unit prior to passing to conventional downstream solids control equipment and to selectively control and meter the flow rate and create a hydrostatic head upstream from the conventional solids control equipment.

2. Brief Description of the Prior Art

The mud system is an integral part of an oil and gas drilling rig, land or marine. Drilling mud or drilling fluid is continually recycled because of the huge cost factor and for environmental reasons. The drilling mud or drilling fluid is used to hold formation pressures in balance, to create and maintain well bore filter cake, create hydraulic horsepower at the bit, hydrostatic testing, shifting of spherical valve elements downhole, and removal of formation solids, cuttings, sand, etc., through the mud return annulus. As the drilling mud or drilling fluid flows from the bell nipple flow line its solids content is refined and removed, through a series of solids control equipment, each removing or separating the plate-like mica structure to a smaller physical size.

It is of the utmost advantage to remove as much solids as practical to reduce down time resulting from plugged flow lines, fluid end repair, drill string erosion, redrilling of the solids or sediments as the drilling mud or drilling fluid recycles itself through the mud system loop.

The conventional mechanical solids control equipment used for removing solids from drilling mud or drilling fluid involves shale shakers and vibratory screens, desilters, desanders, mud cleaners, and centrifuge. This equipment operates at different levels of particle size rejecting solids and retaining desirable solids which can be part of the drilling mud or drilling fluid additives or chemicals.

The mechanical shale shaker screens are limited to short life, and the screens become coated with sticky clays closing the pores or mesh openings resulting in fluid or mud loss. This adds to the problem as additional water must be added to the drilling mud system. This involves the addition of chemical and mud additives to restore the correct and desired mud properties and mud weight, hence the cost of drilling is increased.

The present invention overcomes the aforementioned drawbacks and disadvantages of the prior art and provides additional advantages as well.

The present invention is installed in the flow path of the drilling mud or drilling fluid in the mud system of a drilling rig, upstream of the conventional solids control equipment, and while drilling virgin or young shales it selectively separates and discharges large amounts of drill solids, gumbo, and heavy clays, from the drilling mud or drilling fluid prior to the drilling mud or drilling fluid flowing to the conventional solids control equipment or allows the separation unit to be bypassed. The present weir box employing baffle plates, a sliding gate, and selective utilization of the mud separation unit allows the operator to produce an increased hydrostatic head, which enables high flow rates to be easily processed by shale shakers and other conventional downstream solids control equipment of the mud system and to compliment the drilling operation with respect to changes in the lithology, geological formations, or loss of returns in relation to the gallons pumped or volume of drilling fluid or drilling mud entering the weir box.

SUMMARY OF THE INVENTION

A weir box disposed upstream from conventional solids control equipment of a mud system of a drilling rig contains a drilling mud separation unit having a continuous-loop scalper screen that is driven in a continuous loop to separate, convey and discharge large amounts of gumbo, heavy clays and drill solids at the end of the separation unit. The flow divider box is a box-like housing with a diverter plate, weir baffle plates and a sliding gate that allows drilling fluid or drilling mud to be selectively directed to the mud separation unit to be separated prior to passing to the conventional downstream solids control equipment or allows the fluid to bypass the separation unit and flow directly to the conventional solids control equipment. The sliding gate is adjustable to selectively control or meter the flow rate and to create a hydrostatic head upstream from the conventional solids control equipment. The weir box baffle plates, sliding gate, and selective utilization of the mud separation unit allows the operator to produce an increased hydrostatic head, which enables high flow rates to be easily processed by shale shakers and other conventional downstream solids control equipment of the mud system and to compliment the drilling operations with respect to changes in the lithology, geological formations, or loss of returns in relation to the gallons pumped or volume of drilling fluid or drilling mud entering the weir box.

The mud separation unit is removably installed in the flow divider box and is equipped with a wide tensioned chain-link mud scalper screen driven in a continuous loop around a toothed drive roller and a rear roller propelled by a motor through a gear reduction box. The separation unit is geometrically positioned on rails a predetermined distance apart on the sides of the flow divider box at an angle less than vertical.

The accompanying drawings, which are incorporated in and constitute a part of this specification, illustrate one embodiment of the present invention and together with the description, serve to explain the principles of the present invention.

DETAILED DESCRIPTION OF THE PRESENT INVENTION

Figure 1:
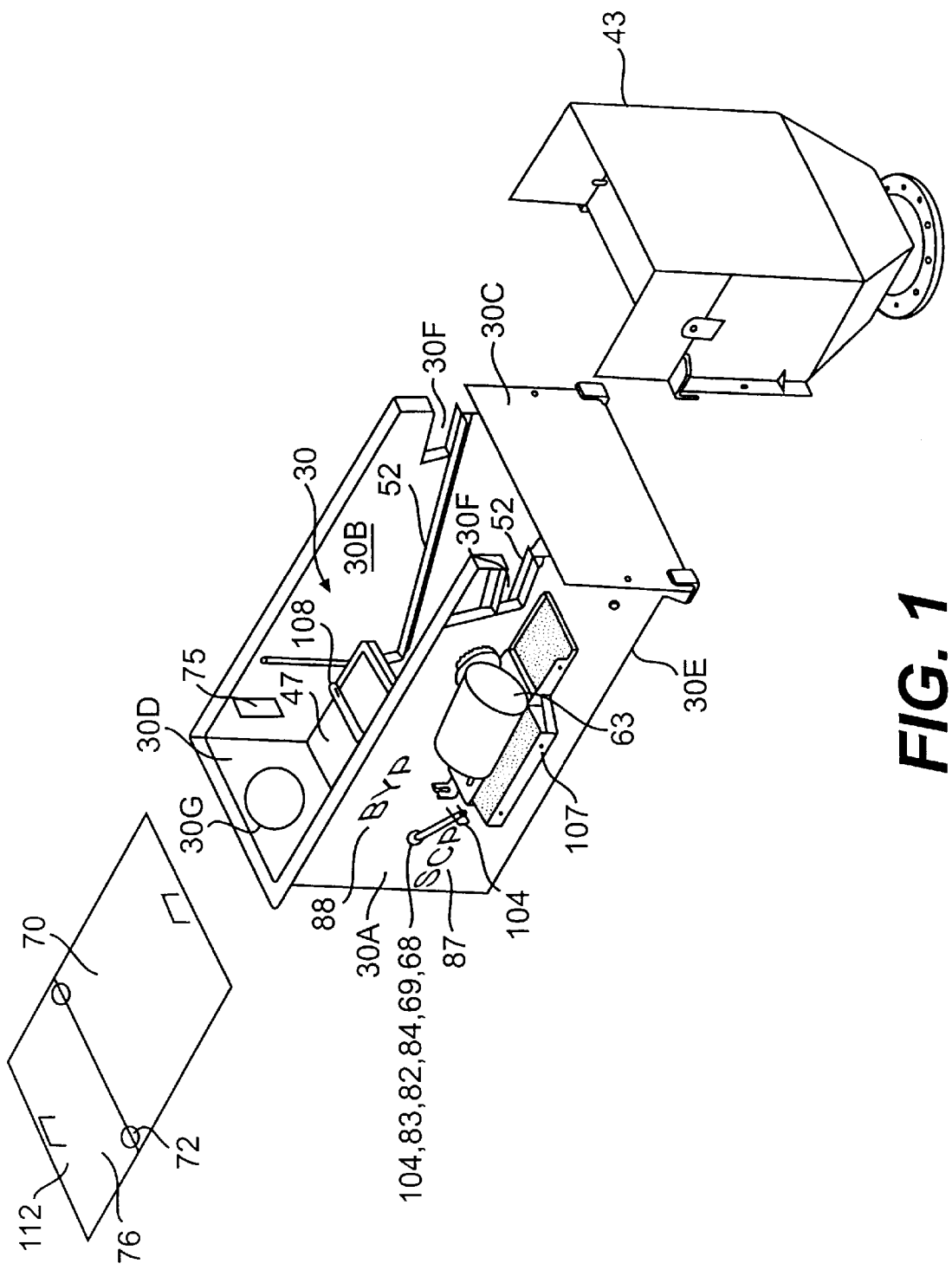
FIG. 1 is an isometric drawing of the weir box in accordance with the present invention.

Referring now to FIGS. 1–4, the weir box 30 is a box-like housing having opposed side walls 30A and 30B, front end wall 30C (discharge end), back end wall 30D (inlet end), and a bottom wall 30E. The box 30 has a horizontal motor support plate 108 on one or both side walls on which a variable or fixed-speed drive motor with gearbox 63 is mounted to drive a drilling mud separation unit 10 (described hereinafter). A pair of elongate laterally opposed rails 52 are mounted on the inside of the opposed side walls and slidably receive and support the drilling mud separation unit 10 (shown in dashed line). The rails 52 are fixed in the weir box at an angle that is preferably from about 70° to about 80° from vertical, measuring from the back wall 30D, or any other suitable angle. The side walls also have cutouts 30F at their front ends to allow the front axle and drive sheave of the drilling mud separation unit to extend through either side of the weir box.

The box 30 has an opening 30G in the upper portion of the back wall 30D (inlet end) through which drilling mud or drilling fluid enters, a discharge outlet 59 at the lower front portion of either of the side walls 30A, 30B, and a cleanout outlet 44 through the bottom wall 30E at its juncture with the back wall 30D. A rectangular cover or top plate 70 encloses the open top end of the box 30. A discharge chute or hopper 43 may be installed on the front end of the box to receive and direct large materials passing over the end of the drilling mud separation unit to a suitable location.

A first baffle plate 50 disposed a distance inwardly from the back wall 30D extends vertically upward a distance from the bottom wall 30E and is secured to the laterally opposed side walls 30A, 30B. The baffle plate 50 has a rectangular window or opening 79 at its bottom end surrounded by a resilient seal 78 sandwiched between two sets of vertical laterally opposed rectangular plates 106 and 109 and a pair of vertical laterally opposed outer rectangular plates 111 and seals 110 secured together by screws 81. A rectangular plate or gate 49 is slidably disposed between the seals 78 and 109 with its side edges slidably disposed between the laterally opposed plates 106. A horizontal bar 74 secured to the top end of the gate 49 extends outwardly toward the back wall 30D. A flat shelf or ledge 96 extends horizontally outward from the top end of the baffle plate 50 toward the front wall 30C.

A pair of rotary shafts 72 rotatably connected at their lower ends to the horizontal bar 74 extend upwardly through laterally opposed cylindrical tubes secured to the interior of the side walls 30A, 30B and are threadedly engaged at their upper ends through collars 71 with lubrication grease fittings 113. The collars 71 are held in stationary position in horizontal slots in the cover or top plate 70 and a crank means such as a hand crank or motorized crank mechanism is secured to the upper ends of the rotary shaft to rotate them. The gate 50 is moved vertically upward to open window or opening 79 allowing free flow of drilling mud or fluid therethrough and downward to close the opening shutting off fluid flow through the opening by rotation of the rotary shafts 72.

A second baffle plate 48 disposed a distance inwardly from the back wall 30D and spaced a distance forwardly from the first baffle plate 50 and parallel thereto extends vertically upward a distance above the bottom wall 30E and is secured to the laterally opposed side walls 30A, 30B. The bottom of the baffle plate 48 is approximately level with the top of the window or opening 79. A pair of laterally opposed stop plates 75 are secured to the inside of the laterally opposed side walls 30A, 30B at their upper ends and are axially offset from the vertical plane of the baffle plate 48.

Figure 2:
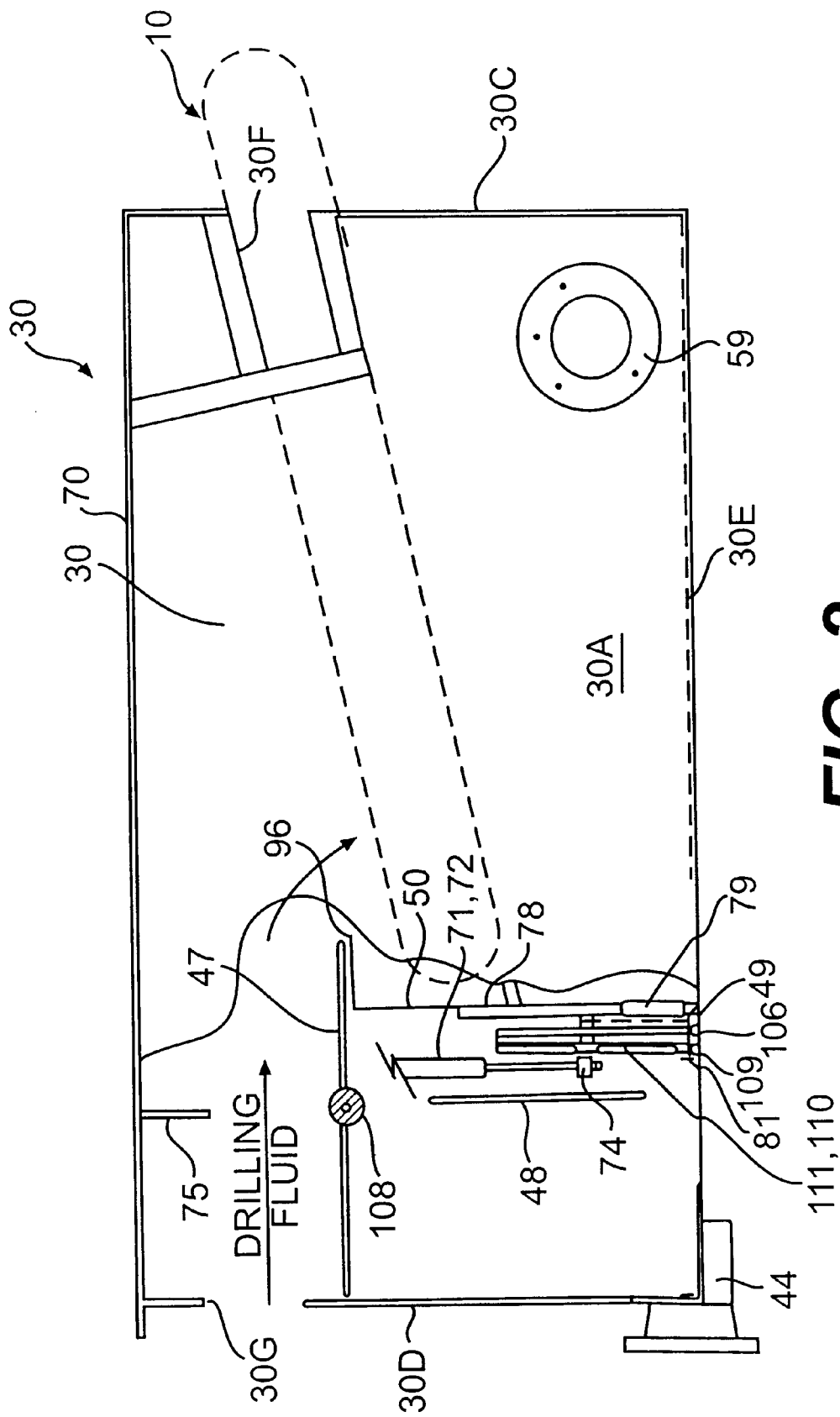
FIG. 2 is a side elevation view in partial cross section of the weir box showing the diverter plate in a horizontal position.
Figure 3:
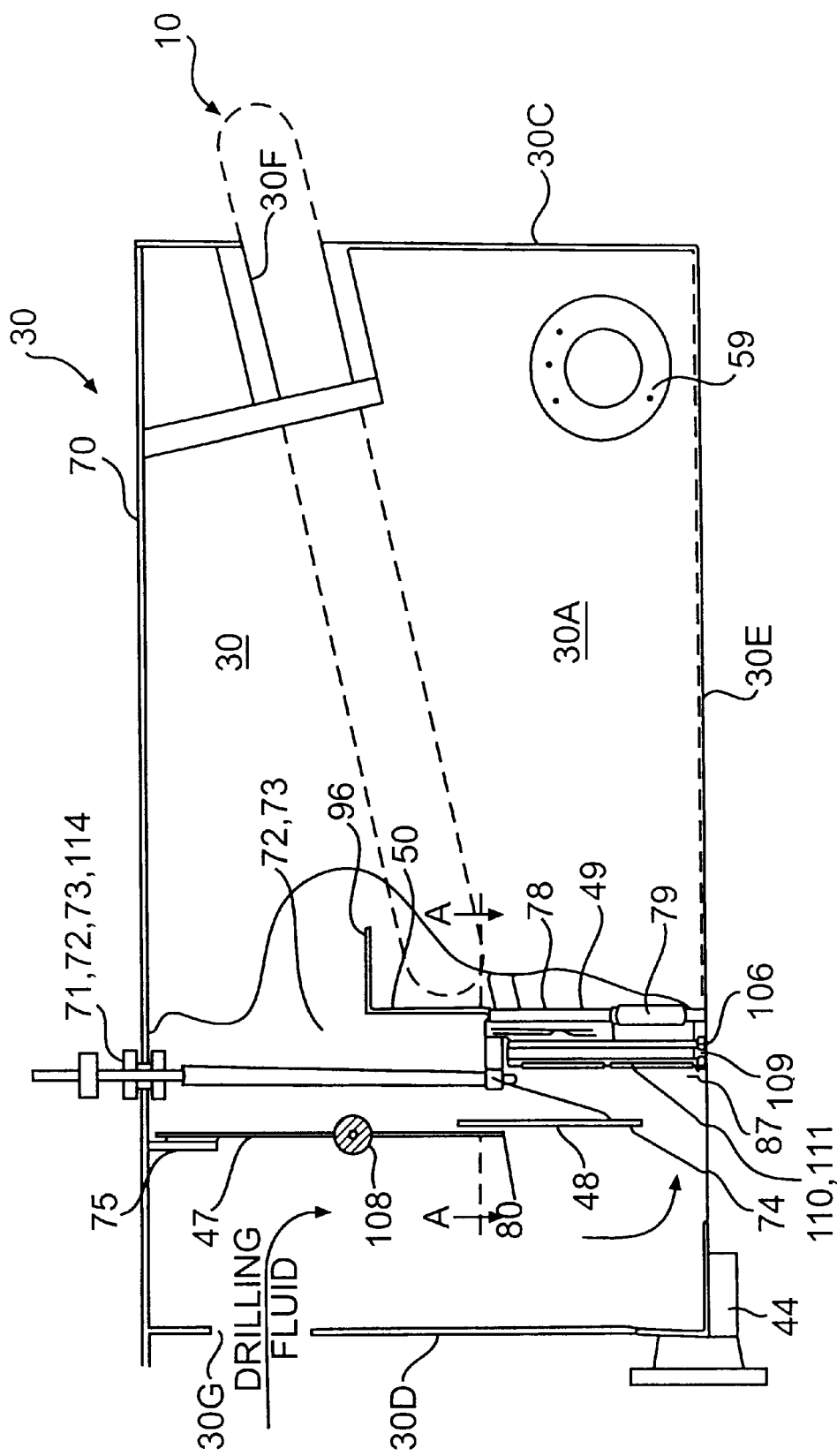
FIG. 3 is a side elevation view in partial cross section of the weir box showing the diverter plate in a vertical position.
Figure 4:
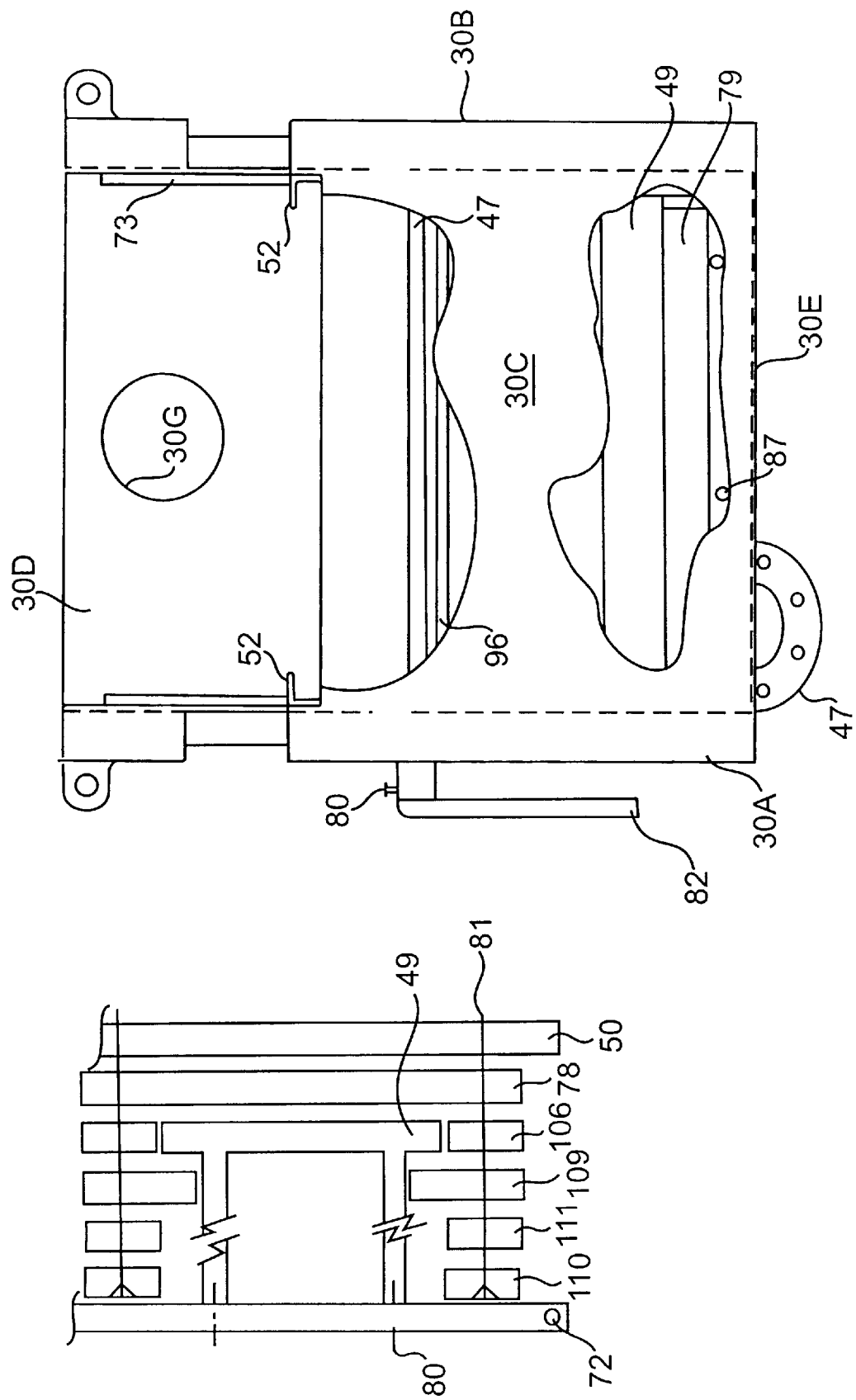
FIG. 4 is a front view of the weir box shown partially in cross section.

A rotatable rectangular rudder or diverter plate 47 is secured at its center to a transverse axle 108 having opposed ends extending rotatably through flange hubs 68 with phenolic bearings 69 and grease fittings 84. The phenolic bearings 69 resist caustic materials in the drilling mud or drilling fluid. A pivot arm or lever 82 is installed on one of the outer ends of the axle 108 for rotating the rudder or diverter plate 47 about the axis of the axle between a horizontal position as seen in FIG. 2 and a vertical position as seen in FIG. 3.

In the horizontal position (FIG. 2) the rudder or diverter plate is disposed horizontally with one end supported on the shelf or ledge 96 and its opposed end engaged on the interior of the back wall 30D. A bracket 104 on the exterior of the side wall of the box serves as a stop for the lever 82 to maintain the rudder or diverter plate 47 in the horizontal position. In this position drilling mud or drilling fluid including gumbo, heavy clays, and large drill solids entering through the opening 30B in the back wall 30D flows across the rudder or diverter plate 47 and onto the scalper screen of the drilling mud separation unit 10. The gumbo, heavy clays, and large drill solids are passed off of the discharge end of the scalper screen of the drilling mud separation unit and the drilling mud or drilling fluid containing smaller particles pass through the array of openings in the scalper screen and enter the compartment beneath the drilling mud separation unit. The gate 49 is positioned in the downward closed position to close the window or opening 79 allowing the separated drilling mud or fluid in the compartment to be conducted through the discharge outlet 59 to the downstream conventional solids control equipment.

In the vertical position (FIG. 3) the gate 49 is raised to open the window or opening 79 in the first baffle plate 50 and the rudder or diverter plate 47 is disposed vertically with one end engaged on the second baffle plate 48 and its opposed end engaged on the stop plates 75 in a position generally parallel with the first baffle plate 50. In this position drilling mud or drilling fluid including gumbo, heavy clays, and large drill solids entering through the opening 30G in the back wall 30D is directed downwardly by the rudder or diverter plate 47 and flows into the compartment between the first second baffle plate 49 and through the window or opening 79 allowing the separated drilling mud or fluid in the compartment to be conducted through the discharge outlet 59 to the downstream conventional solids control equipment, thereby bypassing the drilling mud separation unit.

With the rudder or diverter plate 47 positioned vertically, the gate 49 may also be adjustably positioned at selective positions between the opened and closed position to create a hydrostatic head column upstream from the gate to achieve higher flow rates.

Figure 5:
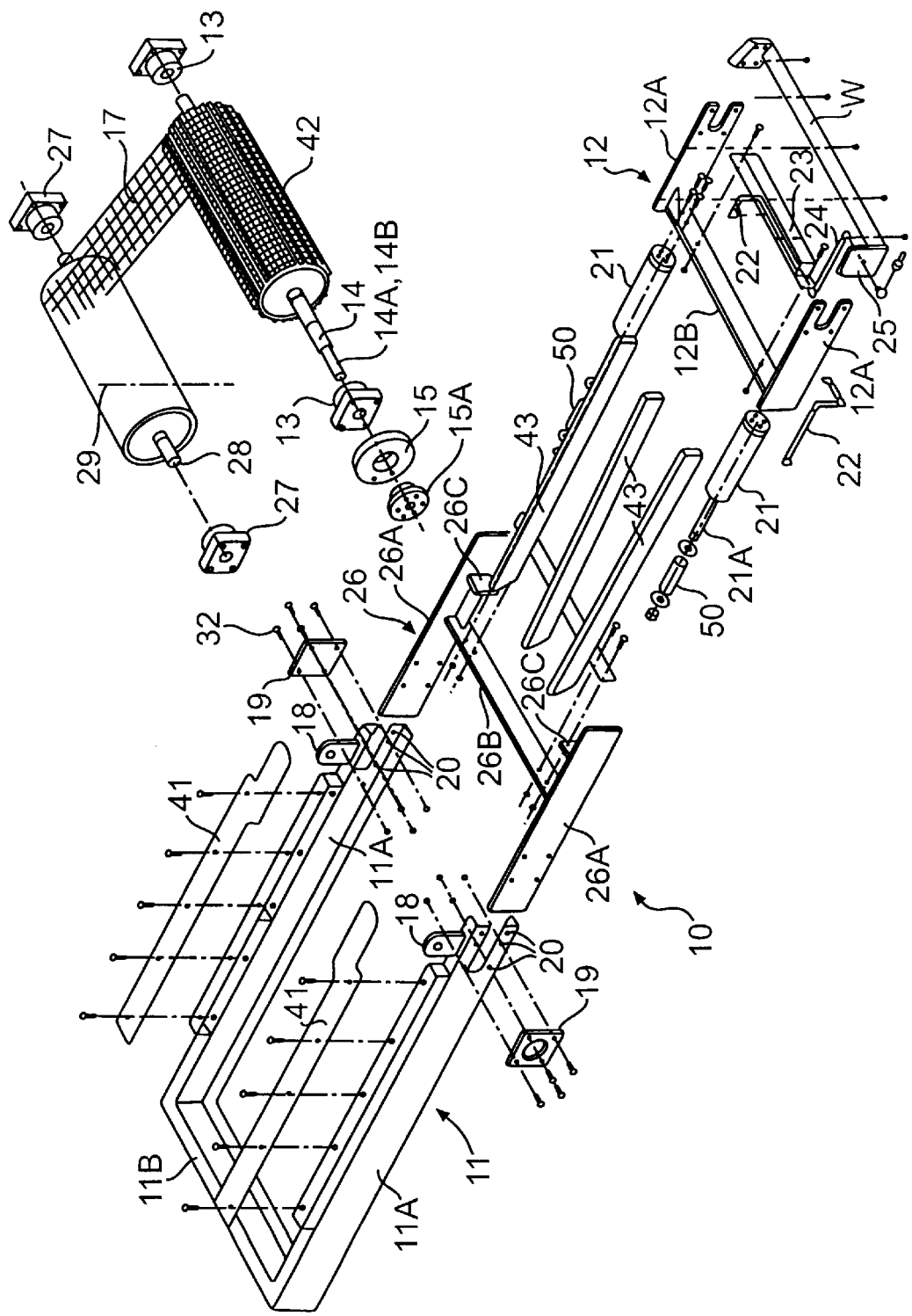
FIG. 5 is an exploded isometric view of the mud separation unit in an unassembled condition.

Referring now to FIG. 5, the drilling mud separation unit 10 which is installed in the weir box 30 has a generally rectangular outer frame assembly 11 formed of side and rear C-shaped channel members 11A and 11B, respectively, that supports an inner front tensioning frame assembly 12, an inner rear tensioning frame assembly 26, and other components.

The separation unit 10 is shown in unassembled condition in FIG. 5. The endless-loop chain link belt 17 is shown schematically in FIG. 5.

The inner front tensioning frame assembly 12 is a generally U-shaped configuration formed of a pair of laterally opposed rectangular side plate members 12A with a transverse rectangular crossmember plate 12B secured between the inner facing ends of the side plates. Front bearings 13 are mounted at the outer ends of the opposed plates 12A. The U-shaped inner front tensioning frame assembly 12 carrying the front bearings 13 and the drive roller 42 is fixedly connected to the front end of the outer frame assembly 11 by spacer plates 19. The axle 14 of the front drive roller 42 is journalled in the front bearings 13 and its outer ends extend through the front bearings 13 and through the outer frame assembly 11 to receive a drive sheave 15 on either the right or left side of the outer frame 11. Thus, the drive sheave 15 can be located on either the left or the first side of the outer frame 11. A keyway 14A, key 14B and retainer hub 15A secure the drive sheave 15 onto the axle 14.

Lifting eyes 18 are secured to the front end of the outer frame assembly 11 to lift and move the separation unit 10 as required. The inner front tensioning frame assembly 12, spacer plates 19, and the front bearings 13 are attached to the outer frame assembly 11 to make the front of the separation unit 10 rigid. Holes 20 are located on the front of the outer frame assembly 11 to attach the inner front tensioning frame assembly 12, front bearings 13 and spacer plates 19.

The inner rear tensioning frame assembly 26 is a generally H-shaped configuration formed of a pair of laterally opposed rectangular side plate members 26A with a transverse rectangular crossmember plate 26B secured between the side plates and laterally opposed end plates 26C secured near the front ends of the side plates. Rear bearings 27 are mounted at the rear ends of the opposed plates 26A. The axle 28 of the rear roller 29 is journalled in the bearings 27. The H-shaped inner rear tensioning frame assembly 26 carrying the rear bearings 27 and rear roller are not rigidly connected to outer frame assembly 11. Instead, the inner rear tensioning frame assembly 26 is slidably received in the C-shaped side channels of the outer frame 11.

Tensioning cylinders 21 are mounted on the inner front tensioning frame assembly 12 and the outer ends of their piston rods 21A are connected to the end plates 26C at the front ends of the side plates 268 of the inner rear tensioning frame assembly 26. Fluid lines 22 connect the tensioning cylinders 21 to a reservoir 23 which is mounted on the transverse crossmember 12B of the inner front frame assembly 12. The reservoir 23 contains a fluid medium (air or hydraulic) with which to operate the tensioning cylinders 21. A fluid line 24 connected to the reservoir 23 extends through a mounting plate 25 attached to the side of the outer frame assembly 11. An air or hydraulic supply line from the rig may be connected to the line 24 to supply air or hydraulic fluid to the tensioning system.

The outer ends of the piston rods 21A of the tensioning cylinders 21 are connected to the end plates 26C at the front ends of the side plates 26B of the inner rear frame assembly 26. The inner rear frame assembly 26 and the rear roller 29 are moved along the C-shaped side channels of the outer frame 11 relative to the outer frame by the tensioning cylinders 21.

Thus, the inner rear tensioning frame assembly 26 carrying the rear roller 29 slides relative to the outer frame 11 and inner front tensioning frame assembly 12 upon extension or retraction of the piston rods 21A of the tensioning cylinders 21. When the piston rods 21A are extended the inner rear frame assembly 26 and rear rollers 29A move rearwardly to apply and maintain tension in the moving chain link belt 17. Tubular collars or spacers 50 may be installed on the piston rods 21A to prevent them from retracting and maintain the tension in the belt 17.

A pair of laterally opposed parallel elongate rectangular guide/support bars 43 are connected at one end to the crossmember 26B of the inner rear tensioning frame assembly 26 and extend forward toward the front of the separation unit 10 and over the crossmember 12B of the inner front tensioning frame assembly 12 to support the chain link belt 17. The guide/support bars 43 move with the inner rear tensioning frame assembly 26 relative to the outer frame 11 as tension is applied or relaxed by the tensioning cylinders 21.

A pair of elongate flat guard rails 41 are mounted at the top ends of the C-shaped channels of the outer frame 11 after the moving chain link belt 17 is installed. The guard rails 41 extend inwardly from the sides of the outer frame assembly 11 over the lateral edges of the moving chain link belt 17 and forwardly over the later ends of the drive roller 43.

The drive roller 42 and hence the chain link belt 17 is driven by the variable or fixed speed motor mounted on the weir box 30 and connected to the drive sheave 15 on the outwardly extended end of the drive roller drive shaft 14.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A weir box for use in the flow path of drilling mud or drilling fluid prior to treatment by conventional solids control equipment of a drilling rig, comprising:

a housing having opposed side walls, a front wall, and a rear wall;

a drilling mud or drilling fluid separation apparatus mounted in said housing;

means in said front wall for introduction of drilling mud or drilling fluid into said housing;

means for selectively directing said drilling mud or drilling fluid introduced to said housing to the separation apparatus for separation of solids therefrom prior to flowing to said conventional solids control equipment or to bypass said separation apparatus to flow directly to said conventional solids control equipment;

means within said housing for producing an increased hydrostatic head of said drilling mud or drilling fluid to increase the flow rate thereof to said conventional solids control equipment; and separate first means for discharge from said housing of removed solids from said separation apparatus and second means for discharge from said housing of drilling mud or drilling fluid from said separation apparatus and drilling mud or drilling fluid directed to bypass said separation apparatus.

2. The weir box of claim 1, wherein said separation apparatus comprises a continuous-loop scalper screen driven in a continuous loop.

3. The weir box of claim 2, wherein said means for selectively directing said drilling mud or drilling fluid comprises a rotatable diverter plate and means for rotating said diverter plate to a first position at which said diverter plate directs said drilling mud or drilling fluid to said separation apparatus and to a second position at which said diverter plate directs said drilling mud or drilling fluid to bypass said separation apparatus.

4. The weir box of claim 3, wherein said means for producing an increased hydrostatic head comprises a gate and means for adjustably positioning said gate to selectively increase or decrease the hydrostatic head of said drilling mud or drilling fluid upstream of said gate to correspondingly increase or decrease the flow rate of said drilling mud or drilling fluid flowing from said weir box to said conventional solids control equipment.

5. The weir box of claim 4, wherein said rotatable divider plate is journalled for rotation on a transverse axle extending between said opposed side walls of said housing.

6. The weir box of claim 5, wherein said first position of said diverter plate is horizontal with respect to said housing and said drilling mud or drilling fluid introduced to said housing is directed across said horizontally positioned diverter plate and onto said continuous-loop scalper screen.

\* \* \* \* \*